US009176949B2

(12) United States Patent
Bullock et al.

(10) Patent No.: US 9,176,949 B2
(45) Date of Patent: Nov. 3, 2015

(54) SYSTEMS AND METHODS FOR SENTENCE COMPARISON AND SENTENCE-BASED SEARCH

(75) Inventors: Bennett Charles Bullock, Arlington, VA (US); Daniel A. Law, Washington, DC (US); Arthur D. Hurtado, Fairfax, VA (US)

(73) Assignee: ALTAMIRA TECHNOLOGIES CORPORATION, McLean, VA (US)

( * ) Notice: Subject to any disclaimer, the term of this patent is extended or adjusted under 35 U.S.C. 154(b) by 373 days.

(21) Appl. No.: 13/543,626

(22) Filed: Jul. 6, 2012

(65) Prior Publication Data
US 2013/0013291 A1    Jan. 10, 2013

Related U.S. Application Data

(60) Provisional application No. 61/504,731, filed on Jul. 6, 2011.

(51) Int. Cl.
*G06F 17/27* (2006.01)

(52) U.S. Cl.
CPC .................................. *G06F 17/2785* (2013.01)

(58) Field of Classification Search
None
See application file for complete search history.

(56) References Cited

U.S. PATENT DOCUMENTS

| | | | | |
|---|---|---|---|---|
| 5,675,819 A * | 10/1997 | Schuetze | .......................... | 704/10 |
| 7,953,593 B2 | 5/2011 | Marchisio et al. | | |
| 2003/0200097 A1* | 10/2003 | Brand | ............................ | 704/500 |
| 2003/0233224 A1* | 12/2003 | Marchisio et al. | ................. | 704/4 |
| 2005/0143971 A1* | 6/2005 | Burstein et al. | .................... | 704/4 |
| 2006/0129843 A1* | 6/2006 | Srinivasa et al. | ............... | 713/189 |
| 2007/0067281 A1* | 3/2007 | Matveeva et al. | .................. | 707/5 |
| 2007/0260693 A1* | 11/2007 | Cardone et al. | ............... | 709/206 |
| 2008/0109399 A1* | 5/2008 | Liao et al. | .......................... | 707/2 |

(Continued)

OTHER PUBLICATIONS

Maciej Ceglowski, Aaron Coburn, and John Cuadrado "Semantic Search of Unstructured Data Using Contextual Network Graphs" National Institute for Technology and Liberal Education Middlebury College 2003.*

(Continued)

*Primary Examiner* — Richemond Dorvil
*Assistant Examiner* — Thuykhanh Le
(74) *Attorney, Agent, or Firm* — The Marbury Law Group, PLLC

(57) ABSTRACT

Systems and methods for performing logical semantic sentence comparisons and sentence-based searches. Training is performed by running an NLP pipeline on unstructured text comprising sentences and creating sentence matrix representations on the unstructured text; storing the matrix representations in an indexed database; combining the stored matrix representations; running an SVD on the combined matrix; storing the SVD components in the indexed database; reiterating through the output of the NLP pipeline the sentences of the unstructured training text to form a low-dimensional matrix conversion for each sentence for storage in the database based on the calculated SVD components. Subsequent query statements are run through the same process based and converted into low-dimensional matrix representations using the SVD components from training; the low-dimensionality query matrix is compared to the stored low-dimensional matrices to determine the closest relevant documents, that are returned to the user.

45 Claims, 6 Drawing Sheets

(56) References Cited

U.S. PATENT DOCUMENTS

| | | | |
|---|---|---|---|
| 2009/0097772 A1* | 4/2009 | Zhao et al. | 382/263 |
| 2009/0177463 A1* | 7/2009 | Gallagher et al. | 704/10 |
| 2009/0248394 A1* | 10/2009 | Sarikaya et al. | 704/4 |
| 2010/0211783 A1* | 8/2010 | Lukaszyk et al. | 713/168 |
| 2010/0223276 A1* | 9/2010 | Al-Shameri et al. | 707/769 |
| 2010/0312724 A1* | 12/2010 | Pinckney et al. | 706/11 |
| 2011/0071826 A1* | 3/2011 | Ma et al. | 704/235 |
| 2011/0087671 A1* | 4/2011 | Lee et al. | 707/741 |
| 2011/0225159 A1* | 9/2011 | Murray | 707/739 |
| 2011/0258178 A1* | 10/2011 | Eidson et al. | 707/714 |
| 2011/0295903 A1* | 12/2011 | Chen | 707/794 |
| 2011/0299721 A1* | 12/2011 | He et al. | 382/100 |
| 2012/0035914 A1* | 2/2012 | Brun | 704/9 |
| 2012/0150532 A1* | 6/2012 | Mirowski et al. | 704/9 |
| 2012/0296967 A1* | 11/2012 | Tao et al. | 709/204 |
| 2013/0138665 A1* | 5/2013 | Hu et al. | 707/749 |

OTHER PUBLICATIONS

Arora, R.; Ravindran, B., "Latent Dirichlet Allocation and Singular Value Decomposition Based Multi-document Summarization," Data Mining, 2008. ICDM '08. Eighth IEEE International Conference on , vol., no., pp. 713,718, Dec. 15-19, 2008.*

Manna, S.; Petres, Z.; Gedeon, T., "Significant term extraction by Higher Order SVD," Applied Machine Intelligence and Informatics, 2009. SAMI 2009. 7th International Symposium on , vol., no., pp. 63,68, Jan. 30-31, 2009.*

Navendu Jain et al., "Using Bloom Filters to Refine Web Search Results:" Eighth international Workshop on the Web and Databases (WebDB 2005), Baltimore, Jun. 16-17, 2005.

Kirk Baker, "Singular Value Decomposition Tutorial," rough draft, Mar. 29, 2005.

* cited by examiner

SYSTEMS AND METHODS FOR SENTENCE COMPARISON AND SENTENCE-BASED SEARCH

CROSS REFERENCE TO RELATED APPLICATIONS

This application claims the benefit of priority to U.S. Provisional Patent Application Ser. No. 61/504,731 entitled "Systems and Methods for Sentence Comparison and Sentence-Based Search," filed Jul. 6, 2011, which is incorporated herein by reference in its entirety.

BACKGROUND

Information Retrieval (IR) is the science of helping the user find a text or other media in a large group of documents. The user usually does this by inputting a query. A search engine takes a query and evaluates it against the group of documents. Usually, this evaluation is a simple number, and the document with the highest or lowest number will be the first document retrieved. Multiple documents can be retrieved, sorted according to this value, allowing the user to see a number of possible matches to what they were looking for.

There are two major types of queries in IR—structured and unstructured. In a structured query, the query must obey a predefined syntax known as a query language. SQL is one of the most widely used query languages. Query languages depend on a pre-defined structured representation of the data, which the user must specify. Since it is extremely difficult to form a consistent and sophisticated representation of the data from natural language, applying query languages to text search is a very difficult task.

Many modern search engines, such as Bing, Google, or AltaVista use unstructured queries, where both documents and queries are represented as a mathematical structure built from a concatenation of words. One of the most commonly used structures is the vector, where each element in the vector is a function of a word's frequency in the document, and distance metrics between these vectors are used to measure similarity or distance between the query and the document. This approach is often referred to as "bag of words."

One of the major limitations to this model is that it does not take into account the order of words in a sentence. If the user typed in "George Bush likes broccoli" and "broccoli likes George Bush," the results would be the same. However, they are saying completely different things, because in the first sentence, "George Bush" is the subject and "broccoli" is the object, and in the second sentence, these roles are reversed. This is because the sentences are expressing different logical relationships. Although some systems, like Watson and Lexis-Nexis, have rudimentary accommodation for these relationships, the dominant vector space model can only handle these in a very unstable and brittle fashion. This is because each word must be indexed not only according to its lexical identity, but also by its role in the sentence, i.e. "George Bush as subject," "George Bush as object," etc. Needless to say, with so many combinations of words and roles, the size of the vectors grows exponentially. Moreover, if the query sentence is "The President likes broccoli," the term "President as subject" will not match with "George Bush as subject."

Some systems attempt to arrive at a logical representation of the sentence by looking at words as they appear in order. While this approach is valid for simple sentences, it fails with complex sentences. For example, in the sentence "Dari, the language of the elite in Afghanistan, is a dialect of Modern Persian," word order alone cannot tell the user that Dari is the subject, and "is a dialect" is the predicate. In fact, some systems, due to their text-cleaning processes, may decide that "Afghanistan" is the subject and "is Modern Persian" is the object. Moreover, if a word were added to the sentence, then it may completely throw off the comparison.

Currently, users searching for documents must either accept a high recall (large number of relevant documents returned) with low precision (low proportion of results are relevant) using "bag of words" approaches, or low recall (few documents returned) with high precision (high proportion of results are relevant) provided by relational approaches. The first option may provide the desired documents, but the desired documents may be buried in a haystack of irrelevant material that can take a lot of time to review. The second option may provide relevant results, but some other relevant results may be missed if the query is not correctly structured relative to the way the data is stored. The desire is to achieve high recall and high precision.

The bag-of-words approach may be improved by using latent semantic indexing (LSI) techniques. In LSI, a document is represented as a vector of real numbers. Each element in this vector corresponds with a word. A zero in an element means that this word is not present in the document. A non-zero value in this element means that the word is present. The magnitude of this value is usually a function of the word's frequency in the document. It is usually a count of that word, normalized in some way. In LSI, a mathematical approach called Singular Value Decomposition (SVD) is used to transform the vector space and effectively reduce the dimensionality of the document vectors, while preserving, many of the meaningful characteristics of documents in terms of the words used. A distance metric between vectors, such as Euclidean distance, indicates how different two documents are from one another in terms of the words used. In a search engine, a query vector and one or more document vectors are compared and the document vectors that minimize this distance are the documents that are returned.

The fundamental unit of data in LSI is the document. Thus, the nuances of language present in sentences (both query sentences and target sentences) are ignored. LSI does not utilize a representation of a sentence that is syntactic and semantic. That is, it does not provide a hierarchical representation of dependencies among parts of the sentence.

SUMMARY

Embodiments are directed to performing natural language semantic searches of a database.

In an embodiment, a natural language search (NLS) is performed by representing a sentence as a graph. Each node in the graph is a word, or some feature associated with the word, such as whether it is a subject or object, or person, place, thing, etc. An "edge" between two nodes indicates a meaningful association between these nodes (e.g. George Bush is a subject). The term "edge" is equivalent to a graph-theoretic term. The extraction of these edges and nodes depends on how the sentence is processed. A node pointing to another node is called a "pointer," and a node being pointed to is called a "target," as in "pointer→target."

A graph may be converted into a matrix. The term "cooccurrence matrix" indicates a matrix that represents a graph in the following fashion: rows of this matrix correspond with pointers, and columns of this matrix correspond with targets. A nonzero value in row i and column j of this matrix indicates that there is an edge from pointer i to target j. A zero value in row i and column j indicates that there is no edge from pointer i to target j. The absolute value of this element is a function of this relationship's frequency.

These relationships are extracted from unstructured text using an "extractor." The term "extractor" refers to any process that takes as its input sentences of unstructured text and produces a graph with edges and nodes as its output. This graph is a structured representation of some type of information encoded by the sentence.

A cooccurrence matrix can be formed from two sources. The first source is an individual sentence. The term "sentence matrix" refers to a cooccurrence matrix formed from an individual sentence. The second source is the "training corpus." The term "training corpus" indicates a set of documents that encodes all the relevant information for the extractor to form nodes and edges. This knowledge base is the set of all nodes and edges that the extractor has extracted from the documents training corpus. It is, in a sense, the knowledge base that allows the system to learn patterns of occurrence for nodes and edges. The term "training matrix" indicates a cooccurrence matrix which represents all nodes and edges that the extractor has extracted from the training corpus. It is readily apparent that the training matrix is the sum of the sentence matrices for each sentence in the training corpus.

In an embodiment, the extractor turns all sentences in the training corpus into sentence matrices. These matrices are summed to form a training matrix C. A nonzero value in the element for the i-th row and j-th column of C means that the training corpus contains an edge from the i-th node to the j-th node, and the absolute value of this element is a function of the frequency of this relationship in the training data.

In another embodiment, a search engine converts a query sentence into a matrix that is compared with other matrices. This is sometimes referred to herein as a "query matrix" or query sentence matrix representation. Both the query sentence matrix representation and the other matrices are derived by applying the results of single value decomposition (SVD) of the training matrix C. SVD is used to reduce the dimensionality of C, computing a transformation that effectively optimizes the information content using much smaller matrices. Individual sentences that are subjected to the computed transform (sometimes referred to herein as P matrices) are compared to the query matrix that is transformed in the same way. The results of this comparison are other sentences, that have previously been the subject of the same type of computed transform (matrix conversion), that have the closest distance to the query P matrix. The comparison returns other sentences that are most semantically related to the query sentence.

DESCRIPTION OF THE DRAWINGS

The accompanying drawings, which are incorporated herein and constitute part of this specification, illustrate exemplary aspects of the invention, and, together with the general description given above and the detailed description given below, serve to explain features of the invention.

DETAILED DESCRIPTION

Figure 1:
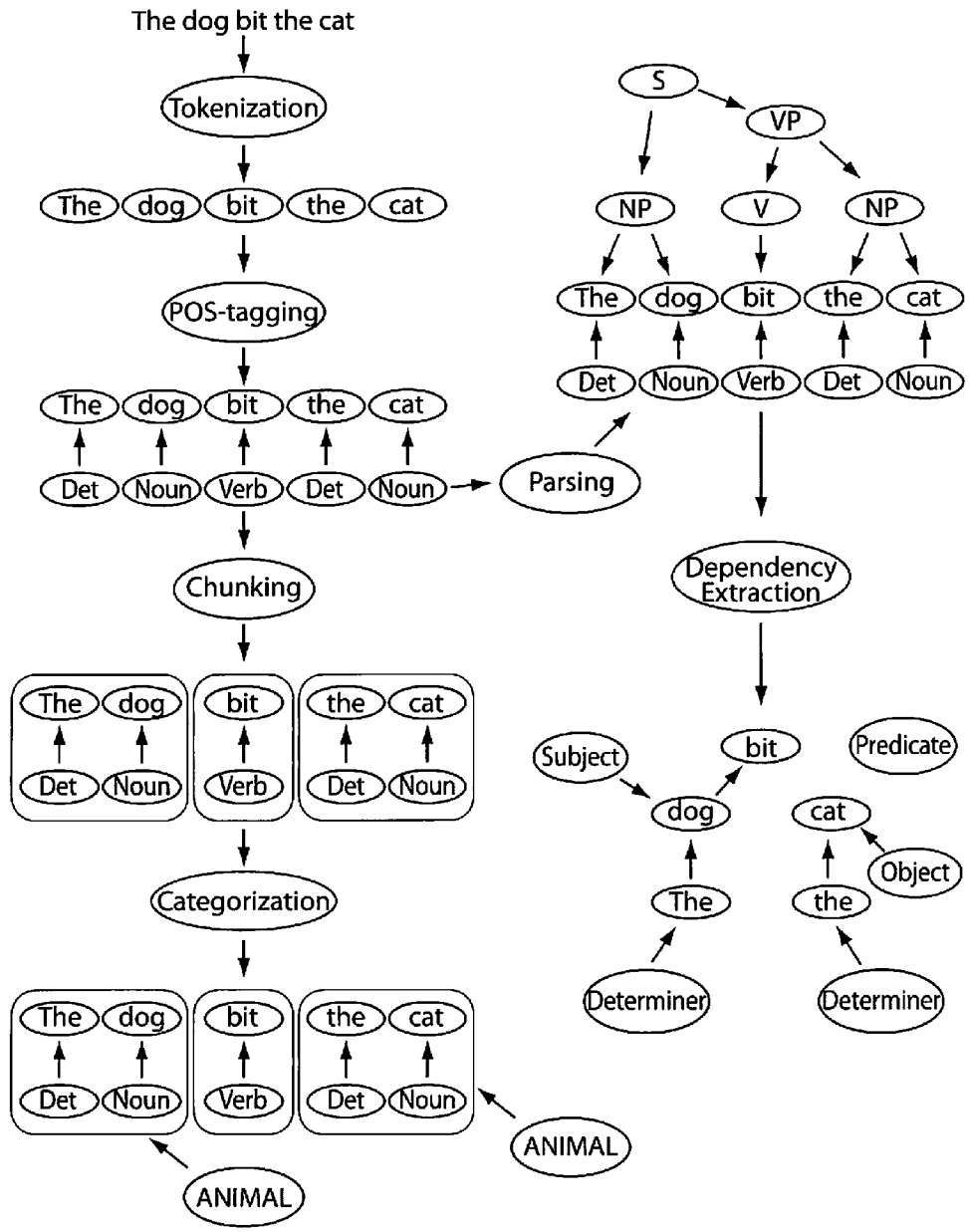
FIG. 1 is a block diagram illustrating the formation of a semantic dependency tree according to an embodiment.

In an embodiment, a natural language pipeline (NLP) (a form of "extractor") is performed on a sentence with the output representing a sentence as a graph. Each node in the graph is a word, or some label for a feature associated with the word. An "edge" between two nodes indicates a meaningful association between these nodes. The term "edge" is equivalent to the graph-theoretic term, and the term "node" is equivalent to the graph-theoretic term, also synonymous with "vertex." The extraction of these edges and nodes depends on how the sentence is processed. A node pointing to another node is called a "pointer," and a node being pointed to is called a "target," as in "pointer→target." There are any number of natural language search engines available in the art which are suitable for the various embodiments noted herein. A graph may be converted into a matrix. The term "cooccurrence matrix" indicates a matrix that represents a graph in the following fashion: Rows of this matrix correspond with pointers, and columns of this matrix correspond with targets. A nonzero value in row i and column j of this matrix indicates that there is an edge from pointer i to target j. A zero value in row i and column j indicates that there is no edge from pointer i to target j. The absolute value of this element is a function of this relationship's frequency.

These relationships are extracted from unstructured text using an "extractor." The term "extractor" refers to any process that takes as its input sentences of unstructured text and produces a graph with edges and nodes as its output. This graph is a structured representation of some type of information encoded by the sentence. The term "extractor" is synonymous with "NLP Pipeline."

A cooccurrence matrix can be formed from two sources. The first source is an individual sentence. The term "sentence matrix" refers to a cooccurrence matrix formed from an individual sentence. The second source is the "training corpus." The term "training corpus" indicates a set of documents that encodes all the relevant information for the extractor to form nodes and edges. This knowledge base is the set of all nodes and edges that the extractor has extracted from the documents training corpus. It is, in a sense, the knowledge base that allows the system to learn patterns of occurrence for nodes and edges. The term "training matrix" indicates a cooccurrence matrix which represents all nodes and edges that the extractor has extracted from the training corpus. It is readily apparent that the training matrix is the sum of the sentence matrices for each sentence in the training corpus.

In an embodiment, the extractor turns all sentences in the training corpus into sentence matrices. These matrices are summed to form a training matrix C. A nonzero value in the element for the i-th row and j-th column of C means that the training corpus contains an edge from the i-th node to the j-th node, and the absolute value of this element is a function of the frequency of this relationship in the training data.

In another embodiment, an extractor converts the unstructured text of a query sentence into a matrix that is compared with other matrices. Both the query matrix and the other matrices are derived by applying the results of single value decomposition (SVD) of the training matrix C. SVD is used to reduce the dimensionality of C, computing a transformation that effectively optimizes the information content using much smaller matrices. Individual query sentences that are subjected to the computed transform (sometimes referred to herein as P matrices) are compared to the query matrix that is transformed in the same way. The results are other sentences that have the closest distance to the query P. The comparison returns other sentences that are most semantically related to the query sentence.

In summary, a processor having memory and a datastore is used to create a searchable database using logical semantic structure of sentences. The sentences may be sentences within a document or sentences within a plurality of documents (sometimes referred to herein as a "training corpus"). The processor has processor-executable instructions to perform operations including but without, limitation receiving unstructured text, running a natural language processor (NLP) pipeline (extractor) on the unstructured text, creating sentence matrix representations of the unstructured text in the training corpus, storing the sentence matrix representations in an indexed datastore, combining the stored sentence matrix representations in a sum as a training matrix, performing a Singular Value Decomposition (SVD) computation on the stored training matrix representation to create calculated SVD components, storing the calculated SVD components in the indexed datastore, and reiterating this process for each all sentence matrices from the NLP Pipeline to form a low-dimensional matrix conversion for each sentence of the documents in the training corpus, based on calculated SVD components for storage in the indexed datastore.

A sentence matrix may be a cooccurrence sentence matrix representation, an adjacency sentence matrix representation, a weighted Laplacian matrix representation, and and/or an unweighted Laplacian matrix representation.

4. The Singular Value Decomposition (SVD) performed on the training matrix (training corpus) in the stored index data is calculated using clustering algorithms, classification algorithms and/or an Apache Mahout library. The SVD computation on the stored training matrix representation $C_i$ comprises creating the z most important calculated SVD components $U_z$, $V_z$, and $S_z$, where z indicates the z singular values with the largest absolute value, and their corresponding singular vectors in $U_z$ and $V_{z,t}$. A low-dimensional projection computation of each stored sentence matrix $C_i$ is created representation data as $P_i = S_z^{-0.5} U = {}^tC_i V_z S_z^{-0.5}$, and the low-dimensional projection matrix $P_i$ is stored in a second indexed datastore. The datastores may be the same or may be logically and/or physically different.

Sentence Comparison Operations

In an embodiment, a NLS algorithm takes any form of relational data as input, where this relational data is derived in some way from unstructured text. Relational data is any data where discrete units of data are paired in ordered sets, and a numerical weight is assigned to this relationship. The relational data are represented as a weighted graph where each node is a unit of data, and the weights associated with each edge are the weights on the links between each node.

A graph is a set of ordered tuples. Each tuple represents an edge between two nodes. The first element in this tuple is a pointer, the second is a target, and the third is a real-valued scalar. If the graph is not weighted, then this scalar is 1. If the graph is weighted, then this scalar is a function of that edge's frequency in the sentence or training corpus. If the graph is directed, then there will only be one tuple for an edge. If the graph is undirected, there will be two tuples, each containing the same pair of nodes, but where each node is alternately the pointer and target. In the first tuple, one node is the pointer and another is the target. In the second tuple, the pointer in the first node is the target, and the target in the first node is the pointer, where each node alternately is the pointer and target node. The numerical weight for both tuples is the same.

In an embodiment, these data are assembled as a "cooccurrence matrix," where the rows correspond to pointer nodes and the columns correspond to target nodes. A nonzero entry at row i and column j indicates that there is a relationship from the pointer node corresponding with row i to the target node corresponding to column j. The value in a nonzero element is the numerical weight corresponding to the relationship. The use of a cooccurrence matrix is not meant to be limiting. As noted above an adjacency matrix can also be used for matrix creation. Moreover, some other matrix-theoretic function of a graph, such as a weighted or unweighted Laplacian matrix, could also be used.

There are several ways to derive relational data from unstructured text. By way of illustration and not by way of limitation, an extractor using a sliding window of length "n" may be used. For example, a window with a length of three words builds edges from each successive sequence of three. For example, in the sentence "frogs eat bugs and flowers," the window would contain "frogs eat bugs," "eat bugs and," and "bugs and flowers," in successive iterations. At each iteration, the extractor would create the edges <frogs, eat, 1>, <eat, frogs, 1>, <frogs, bugs, 1>, <bugs, frogs, 1>, <bugs, eat, 1> and <eat, bugs, 1>.

In an alternate example, semantic relationships may be explicitly extracted from a sentence, including subject-predicate-object relationships and noun-preposition-noun relationships.

In an embodiment, a "semantic dependency tree" is constructed from tokenization, part-of-speech tagging, chunking, ontological categorization, parsing, and extraction of semantic dependencies. As illustrated in FIG. 1, each stage constructs an annotation object:

Tokenization. This marks strings separated by whitespace and punctuation, corresponding with words.

Parts of Speech (POS)-Tagging. Words are assigned parts-of-speech, such as noun, verb, adjective, etc. This is useful for all downstream processes.

Chunking. Words are grouped into phrases according to their parts of speech, so that phrases such as "American President," "has given," or "British Parliament," are registered as individual chunks.

Categorization. This assigns tokens and chunks with a relevant category, such as Person, Place, Location, Organization, etc.

Parsing. This builds a tree structure of syntactic dependencies based on Transformational Grammar.

Semantic Dependency Extraction. This collapses syntactic dependencies into meaningful semantic dependencies, such as "subject," "predicate," "object," "object of preposition," etc.

Figure 2:
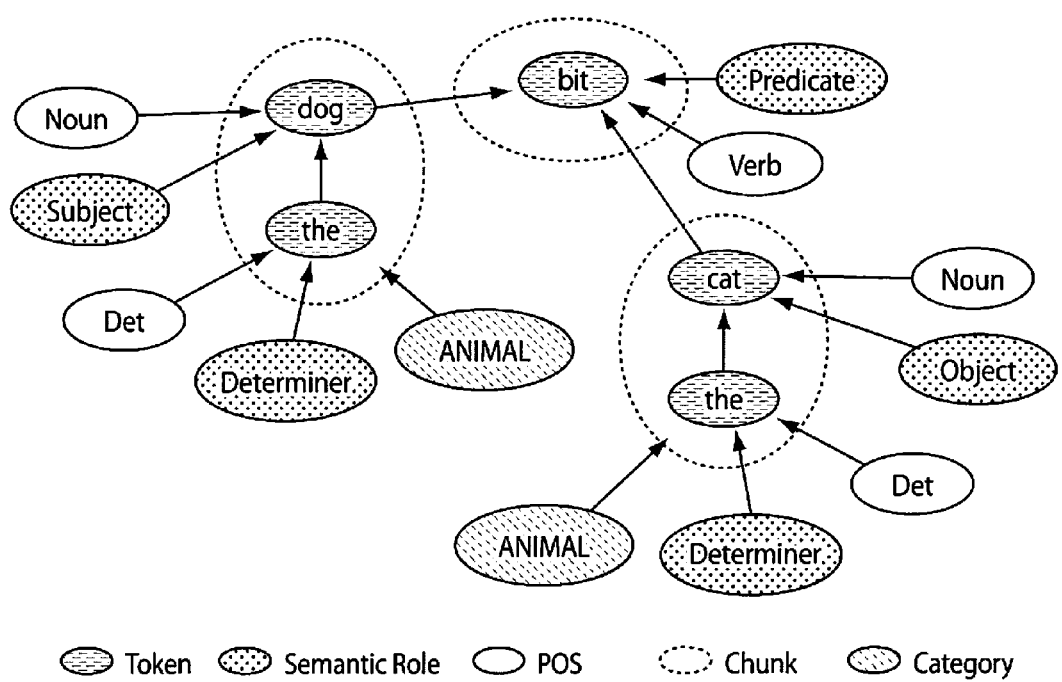
FIG. 2 is a block diagram illustrating a hierarchical structure and the dependencies among various components of output of the semantic dependency tree according to an embodiment.

The final product of this pipeline is a hierarchical structure which shows dependencies among various components of output, as illustrated in FIG. 2. For example, the output of the NLP pipeline (black arrows) show edges that appear in the cooccurrence matrix. The pointing node corresponds with a row in the matrix, and the target corresponds with a column.

This output can easily be described in the tuple description of a weighted graph given above, as <Noun, dog, 1>, <Subject, dog, 1>, <Det, the, 2>, <Determiner, the, 2>, <ANIMAL, the dog, 1>, <dog, bit, 1>, <Predicate, bit, 1>, <Verb, bit, 1>, <cat, bit, 1>, <the, cat, 1>, <Noun, cat, 1>, <Object, cat, 1>, and <ANIMAL, the cat, 1>.

The correspondence of the graph and the features of the NLP tree are as follows:

The graph has a root node, which is the word corresponding with the predicate in the semantic dependency tree ("bit" in FIG. 2). The graph has several head nodes, which are defined as the nodes corresponding to the words. The graph then has several subordinate nodes, which are defined as the nodes corresponding to various features assigned to the words or chunks. The schema for representing the sentence hierarchically is as follows:

The root node corresponds to the word for the predicate in the sentence. Head nodes correspond to all other words. Subordinate nodes correspond with chunks or other features associated with words.

The pointing relationships are as follows:

The root node does not point to any other node. All head nodes point to other head nodes, as determined by the semantic dependency tree. Subordinate nodes corresponding with chunks point to the highest head node they contain. Subordinate nodes corresponding with other features (POS tags, categories) point to either chunks or words, depending on the output of the NLP pipeline.

Matrix Forming Operations

In an embodiment, in the training and querying, the relationships established by the operation of the sentence comparison operations are translated into a cooccurrence matrix. Each row or column of the cooccurrence matrix is indexed by a string identifying a node in this graph. This string preferably consists of an all-caps tag for the type of node in which it appears as, such as "WORD" or "POS_TAG." This is followed by a double-colon-separated string value. Therefore, the word "dog" in FIG. 2 would be indexed by "WORD:: dog," "POS_TAG::Noun," and "SEMANTIC_ROLE::Subject."

The rows of the cooccurrence matrix are indexed by pointers. The columns of the cooccurrence matrix are indexed by targets. When a pointer node indexed by i points to a target indexed by j, the element in the i-th row and the j-th column is non-zero. The matrix is preferably square, so that for i unique features observed in the training data, any subsequent cooccurrence matrix must be i×i. Define $w(h_n)$ as a weighting function which decreases monotonically with the node n's distance from the root node—or the shortest path in the graph transitions from n to the root node. One candidate for this function is $$w(h_n) \stackrel{M}{=} c^{\frac{1}{h_n}},$$

where c is a constant. For every pointer node j and target node k, the element of C at the j-th row and k-th column is updated as:

$$C_{j,k}' = C_{j,k} + w(h_w)$$

The matrix forming module 104 processes three different groups of cooccurrence matrices. They are all formed by processing text through the NLP pipeline:

1. A cooccurrence matrix for each sentence in the training corpus, $C_S$. This is formed by processing a single sentence through the NLP pipeline.

2. The sum of cooccurrence matrices for all training data, $C_T$. This is formed by processing a sentence from the training corpus through the NLP pipeline.

3. The cooccurrence matrix for an incoming query, $C_Q$. This is formed by processing a sentence from a query through the NLP pipeline.

In an embodiment, the matrices $C_S$, $C_T$ and $C_Q$ are i×i, indexed by the same set of words and labels. In this embodiment, $C_T$ is formed from the training data and then $C_S$ for each sentence is formed.

Comparing two cooccurrence matrices directly would be of limited value, since the words and labels must match exactly. In an embodiment, a matrix forming module 104 employs a Singular Value Decomposition (SVD) technique on $C_T$.

According to matrix theory, a matrix A is the product of three matrices, or A=U S V', where ' is the transpose (switching the row and column indexes of each element):

a) U, a matrix whose columns are the normalized eigenvectors of A A'. These columns are called the left singular vectors. The left singular vectors represent "concurrence patterns," or commonalities, in the rows of A.

b) V, a matrix whose columns are the normalized eigenvectors of A' A. These columns are called the right singular vectors. The right singular vectors represent concurrence patterns in the columns of A.

c) S, a diagonal matrix. Each element in this diagonal is the square root of an eigenvalue of both A' A and A A'. (A' A) is a symmetric matrix, and has real eigenvalues L. Its transpose, (A' A)'=A A', is also symmetric, and has the same eigenvalues. Therefore, the n-th singular value in S corresponds to both the n-th left singular vector, or the n-th column of U, and the n-th right singular vector, or the n-th column of V.

It is possible to put the singular values of S in any order, as long as the corresponding left and right singular vectors are in the same order. Therefore, it is possible to sort the values of S in descending order, with the largest value first. If we do this sort, and take the first z singular values $S_z$, the first z left singular vectors $U_z$, and the first z right singular vectors $V_z$, we can produce a matrix which approximates A, as $A_z = U_z S_z V_z'$.

Applying this technique to the cooccurrence matrix for all training data, $C_T$, $C_T$=U S V'. S is a diagonal matrix of singular values of A, sorted in descending order according to their absolute value. The columns of U are the orthonormal eigenvectors of the matrix of A A', sorted according to the absolute value of their corresponding singular values in S. The columns of V are the orthonormal eigenvectors of the matrix of A' A, sorted according to their corresponding singular values in S.

Any high dimensional cooccurrence matrix from the NLP pipeline, C, may be projected to a lower-dimensional space. Assigning a dimensionality for this space z<i, the largest z singular values S, according to their absolute value, the corresponding columns of U and the corresponding columns of V, are used to form as $U_z$, $S_z$, and $V_z$. A z×z projection matrix for a sentence matrix $C_i$, $P_i$, may be defined as $P_i = S_z^{-0.5} U_z' C_i V_z S_z^{-0.5}$. It is important to note that $U_z$, $S_z$, and $V_z$ are from the SVD of the training matrix C, not $C_i$.

Intuitively, $P_i$ is a description of clusters of nodes pointing to other clusters. Since columns of U cluster pointer nodes by their shared targets, and columns of V cluster target nodes by their shared pointers, a non-zero element of $P_i$ states that members of one cluster of nodes are pointing to members of another cluster node. This has the advantage of having nodes which are in some way similar clusters in the same dimension. $S_z^{-0.5}$, the reciprocal of the square roots of the singular values, is used for normalization.

Sentence Comparison

Let dist(X,Y) be some scalar distance metric for two same-dimensional matrices $P_1$ and $P_2$. In one embodiment the Frobenius norm of the difference is used:

$$dist(P_1,P_2) \equiv \|P_1-P_2\|_F.$$

In an embodiment, all sentences in the training data corpus used to form lower-dimensional projections of each using the above-described method. These projections are then stored in a database.

A query by a user is converted to a lower-dimensional projection in a similar manner. This query projection is then compared to the projections of the training data in the database. A distance metric for the query projection and each projection in the database is determined. The m sentences with the lowest distance metric, along with their corresponding documents, are returned to the user.

In summary a query can be created by a user to send a query to the database created by the training corpus activity noted above, using logical semantic structure of the query sentences. In this case, the query is received by a processor as unstructured query text from a user device, the same natural language processor (NLP) pipeline (extractor) as used on the training corpus is used on the unstructured query text. A sentence matrix representation of the unstructured query text is then created and stored in an indexed datastore. The sentence matrix representation of the unstructured query text is converted into a low-dimensional matrix using the SVD components calculated in the same manner as described above with the training corpus.

Sentences having similar semantic structures to that of the query sentence are identified by comparing the low-dimensional converted query matrix representation to the unstructured text low-dimensional matrix representations that were converted using the same SVD components as created during the training corpus stage (above). A distance between the low-dimensional converted query matrix and the low-dimensional matrix representations of the unstructured text stored in the database that were converted using the same SVD components as were created during the training corpus stage (above). Those documents having the closest distance between the low-dimensional converted query matrix and the low-dimensional matrix representations of the unstructured text previously stored in the database that were converted using the same SVD components as previously created are then returned to the user/user device. During this overall process a low-dimensional projection computation is performed on the stored query sentence matrix representation data, and that low-dimensional query data is stored in a second indexed datastore.

The sentence matrix representation of the unstructured query text may be a cooccurrence matrix representation, an adjacency matrix representation, a weighted Laplacian matrix representation, and/or an unweighted Laplacian matrix representation.

Implementation

In an embodiment, a NLS system is generated using a training stage and a querying stage. The training stage involves entering the training data into the system and performing the necessary computations as noted above. The querying stage involves entering a new sentence indicative of a user's query into the system, processing the query in the same fashion as the training data, and matching the query results with sentence data already stored in the system.

Workflow and System Architecture.

In an embodiment, a semantic search system, that is suitable to analyze training data and query data contains the following components:

An NLP pipeline which processes unstructured text to produce relational data.

A data store which holds the trained cooccurrence matrix, (or other matrix types known in the art), SVD components determined from the matrices, and the database of sentences processed into P matrices according to these SVD components. In an embodiment, a database index, or "data index," is used for the data store. In an embodiment an Accumulo database is used to create and hold the cooccurrence matrix although this is not meant as a limitation. In another embodiment, HBase is used for the index, although again this is not meant as a limitation. In still another embodiment, Cassandra is used for an index although, MySQL may also be used for other indices. Other index operators and programs may also be used.

A server application which extracts the cooccurrence matrix from the data store, performs SVD to compute and store a transform that reduces any C matrix dimensionality into lower-dimensional projection (P matrices). In an embodiment, the SVD functions are based on the linear algebra capabilities from an Apache Mahout library that allows clustering and classification of topically related documents, although this is not meant as a limitation. Other machine learning algorithms capable of clustering and classification of document will also be useful in the various embodiments illustrated herein.

The servers that are illustrated herein may be individual servers that are physically separate from one another, they may be logically separated servers residing within a single piece of equipment, and/or may be a cloud-based server architecture wherein separate activities are conducted on multiple servers which together create the functionality described herein. Thus, the use of the term "server" should not be deemed to be limiting to a single device.

A server application converts individual sentences of training data into P matrices using the computed transform.

When a user wishes to send a query for information, a server query processing application converts query sentences into lower-dimensional projections (P matrices), and compares them to existing P matrices in the data store.

A server query comparison application returns the original sentences that, in the form of P matrices, are closest in distance to the query, together with the documents related to the closed sentence(s).

A graphic user interface allows users to enter their queries and receive documents which contain sentences similar to the queries.

The processing operations performed by these components may be performed on one or more processors. The one or more processors may be stand-alone devices, part of a multi-core processor, or a component of one or more CPUs that are operative on a computing device. The one or more processors could also be on different servers which cooperate as in a cloud-based environment. If all components are put on a single machine, it may also be a tablet, a smartphone or any other processor-equipped device.

Figure 3:
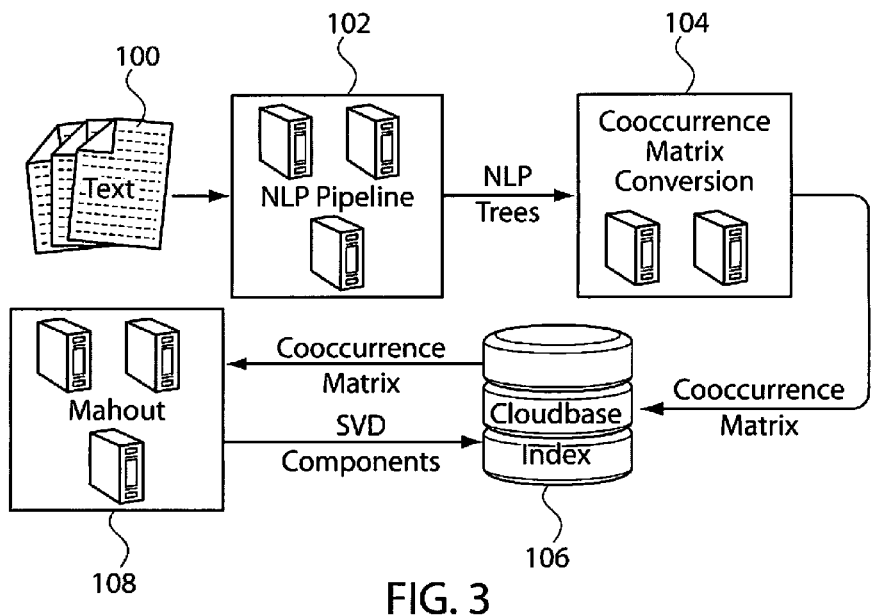
FIG. 3 is a block diagram illustrating stages 1-5 of the training phase according to an embodiment.

Referring now to FIG. 3, the training stage is illustrated leading to creation of Singular Value Components. In an embodiment, a training stage has the following operations:

Text 100 is input to the system. An NLP pipeline (extractor) is then applied 102 to the input unstructured text. The output of the NLP pipeline is then converted to a cooccurrence matrix 104 and the results are stored 106 into the data index to produce a file of cooccurrence sentence matrices. These sentence matrices are summed to produce a training matrix. This training matrix is sent through a Mahout matrix operation 108 for conversion to SVD components. The SVD components are then stored in the data index 106.

This process is repeated by running the training data through the output of the NLP pipeline, forming a cooccurrence matrix for each sentence of a reference and a lower-dimensional projection. In this fashion, $P_1$ is formed for each sentence, matrix $C_i$. Each store projection is then stored, and associated with its document and sentence in the data index. The store matrix representations are then combined in a SVM as a training matrix.

Figure 4:
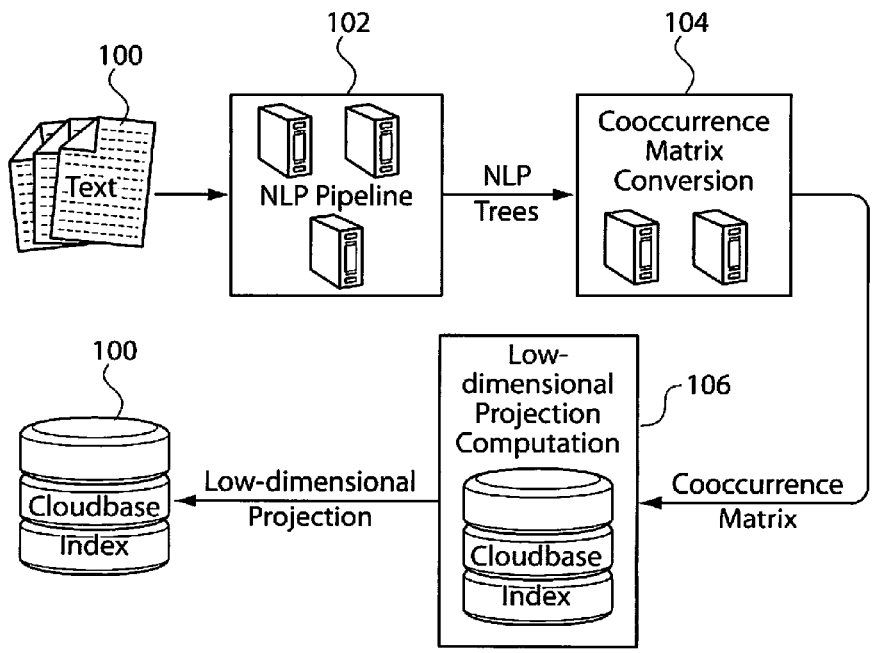
FIG. 4 is a block diagram illustrating stage 6 of the training phase according to an embodiment.
Figure 5:
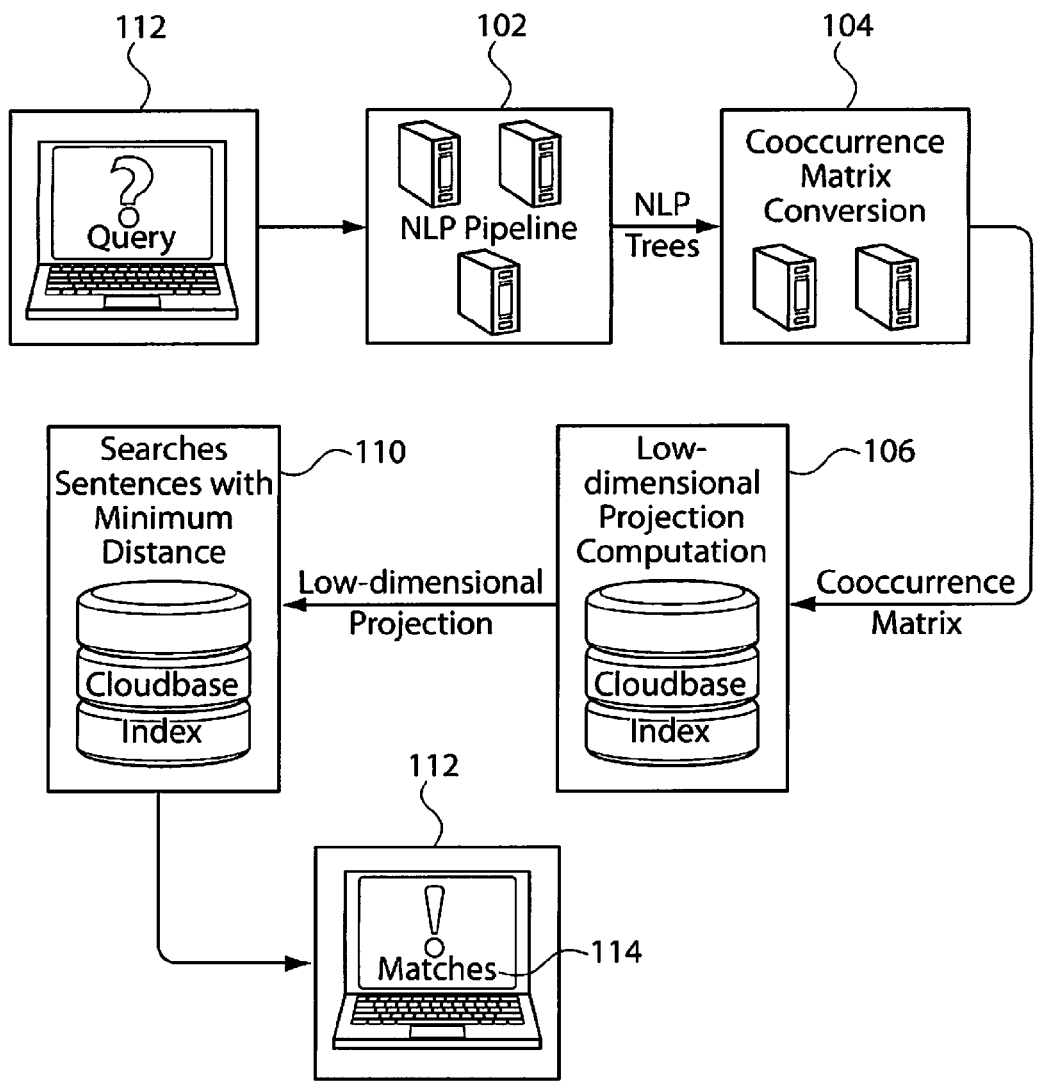
FIG. 5 is a block diagram illustrating stages 1-6 of a query phase according to an embodiment.

Referring now to FIG. 4, the creation of training data is further illustrated. A query text 100 is input to the system. An NLP pipeline is then applied 102 to the unstructured query text. This output of the NLP pipeline is then converted to a cooccurrence matrix 104 and the results are stored 106 into the data index to produce a file of cooccurrence matrices. Thereafter a low dimensional projection computation 106 is performed on the stored cooccurrence matrices and the resulting low dimensional projections are stored in a second data storage 110.

In another embodiment, a querying stage utilizes the following operations:

Receiving a query from a work station or user device 112 in the form of a question, and/or a statement. The NLP pipeline is then run 102 on the query 112. The results of the NLP processing on the query are converted to a cooccurrence matrix 104. The results of the query cooccurrence matrix conversion are stored in a data storage 106. Compute the lower-dimensional projection for this matrix based on the query 106. Low-dimensional projection computation is the performed 106 on the stored query cooccurrence matrix data. The query low-dimensional data is then compared to the stored low-dimensional data in the second datastore 110 to compute the distance of the query low-dimensional data to the stored low-dimensional data in the second data store 110. The system then returns the sentence and document that minimizes this distance 114 as a "match." Sentences and documents with a less-than-optimal distance metric are less good matches, sorted according to the distance metric. The information retrieved can then be displayed on the user device 112.

In an embodiment, training is controlled by a single server although this is not meant as a limitation. In cloud based applications, multiple servers may also be used for training large amounts of data. Querying is then controlled by a server which interacts with both the NLP pipeline to create the query matrix and related SVD computations for the query statement, and to perform comparison and interaction with the data index of the training data.

The NLP Pipeline.

Unstructured text is processed by an NLP pipeline (extractor) constructed of any software which constructs a graph-theoretic representation of unstructured text derived from tasks, such as tokenization, POS-tagging, ontological categorization, parsing, and semantic dependency extraction.

The NLP pipeline, illustrated in FIG. 1, currently performs several operations on unstructured text. For each operation, it creates a tree structure described above.

To perform categorization, several methods are used. The first is a series of regular expressions, defined entirely using configuration files. Then, there is the categorizer, which uses Maximum Entropy. In an embodiment, OpenNLP performs categorization, although this is not meant as a limitation.

This categorizer points to a data index which maps terms—words or phrases—to categories and contexts. When a term has multiple categories, these contexts are used to determine which category will be assigned to the term. This is traditionally done through a distance metric of binary vectors. A category's context is defined as a binary vector, where each element is associated with a given term. The elements with "1" will signify that this term is a commonly cooccurring term. Another binary vector is taken for the document in which that term appears. The vector for each category is compared with the vector for the document, and the category with the optimal distance metric is chosen as the category for that term. The distance metric used in this algorithm is based on cosine distance, which is, for vectors $v_1$ and $v_2$, $$\frac{v_1' v_2}{\|v_1\| \|v_2\|}.$$

When done in conventional terms, this can be computationally expensive. Both the words of the document and the words of the context must be converted into binary vectors on the fly. Moreover, every word in the context must be stored. In an embodiment, contexts are represented as Bloom Filters. A Bloom Filter is a bitstring which probabilistically indicates set inclusion. Any object inserted into the set is given a bit-wise "signature." This is taken from several different hash algorithms run on this object, and the results of these determine a combination of bit positions. In the bitstring, the bits in these positions are set to 1. To determine whether an object is part of a set, this signature is taken for the object and OR'ed with a blank bitstring. This bitstring is then AND'ed with the Bloom Filter. If the resulting bitstring has the signature, then the object is determined to be part of the set. In this way, the Bloom Filter guarantees no false negatives, and the probability of false positives shrinks exponentially with the length of the filter.

In an embodiment, categorizer utilizes teachings of Jab et al. (http://citeseerxist.psu.edu/viewdoc/summary?doi=10.1.1.82.1214) in showing that the numerator of a cosine similarity is proportional to the bitcount of two AND'ed Bloom Filters. Therefore, words for a category's context can be inserted into one Bloom Filter, and words appearing in the document can be inserted into another. The category corresponding with the Bloom Filter that maximizes this bit-count metric with the document is the category for the term.

This has two advantages over forming binary vectors explicitly. Firstly, Bloom Filters represent the context of a word in a storage-saving bitstring, whose growth is logarithmic to the number of objects needed to be represented. This contrasts with the linear growth of storing a word-list explicitly. Secondly, these computations involve a small number of bitwise operations. Words for contexts are taken from Wordnet, by crawling the vicinity of this word sense's node, from definitions in the Suggested Upper Merged ontology (SUMO), and from Wikipedia definitions indicated by YAGO. They are then inserted into the bloom filter for that category. The categorizer forms a Bloom Filter from words in the document. A term's category is determined by taking the bitcount of the AND of the Bloom Filters for the context and the document.

Mathematical Manipulation of the Cooccurrence matrices.

$C_T$ is produced by iterating across the output of the NLP pipelines and storing the result in a data index. This index is then output to a dense Mahout matrix, and SVD is performed on this matrix: $C_T$=USV'. The first z singular values and vectors are taken from these SVD components as $S_z$, $U_z$, and $V_z$, and stored in the data index. Then, a cooccurrence matrix for each sentence in the training data is formed, and these cooccurrence matrices are projected to a lower-dimensional space: $P_s = S_z^{-0.5} U_z' C_s V_z S_z^{-0.5}$. These projections are then stored in the data index, associated with their corresponding sentence and document.

Querying.

In an embodiment, a natural-language query may be a declarative sentence or a question. Questions have similar semantic dependency trees to declarative sentences, so they are likely to match with declarative sentences which respond to the question. In another embodiment, a Graphical User Interface (GUI) presents a field for the natural language query and a "submit" button. When this button is pressed, the query is processed through the NLP pipeline, converted into a cooccurrence matrix. A low-dimensional projection is formed from this query cooccurrence matrix. This lower-dimensional projection is then compared to every sentence in the database. The m sentences with the lowest distance, alongside their documents, are returned to the GUI in a list which displays both the documents and the highlighted sentences which have the highest similarity.

Figure 6:
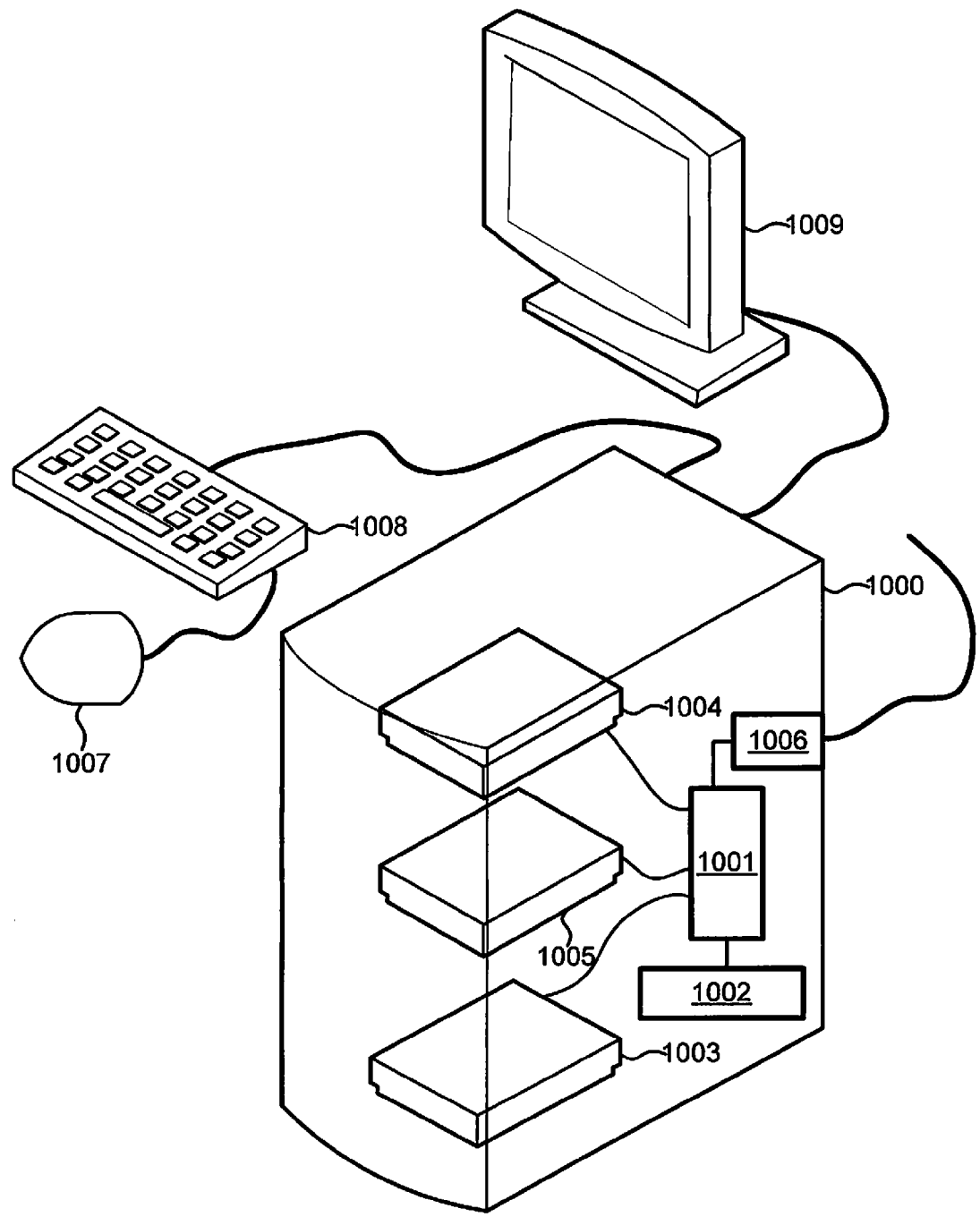
FIG. 6 is a block diagram of a computing device suitable for use with any of the embodiments.
Figure 7:
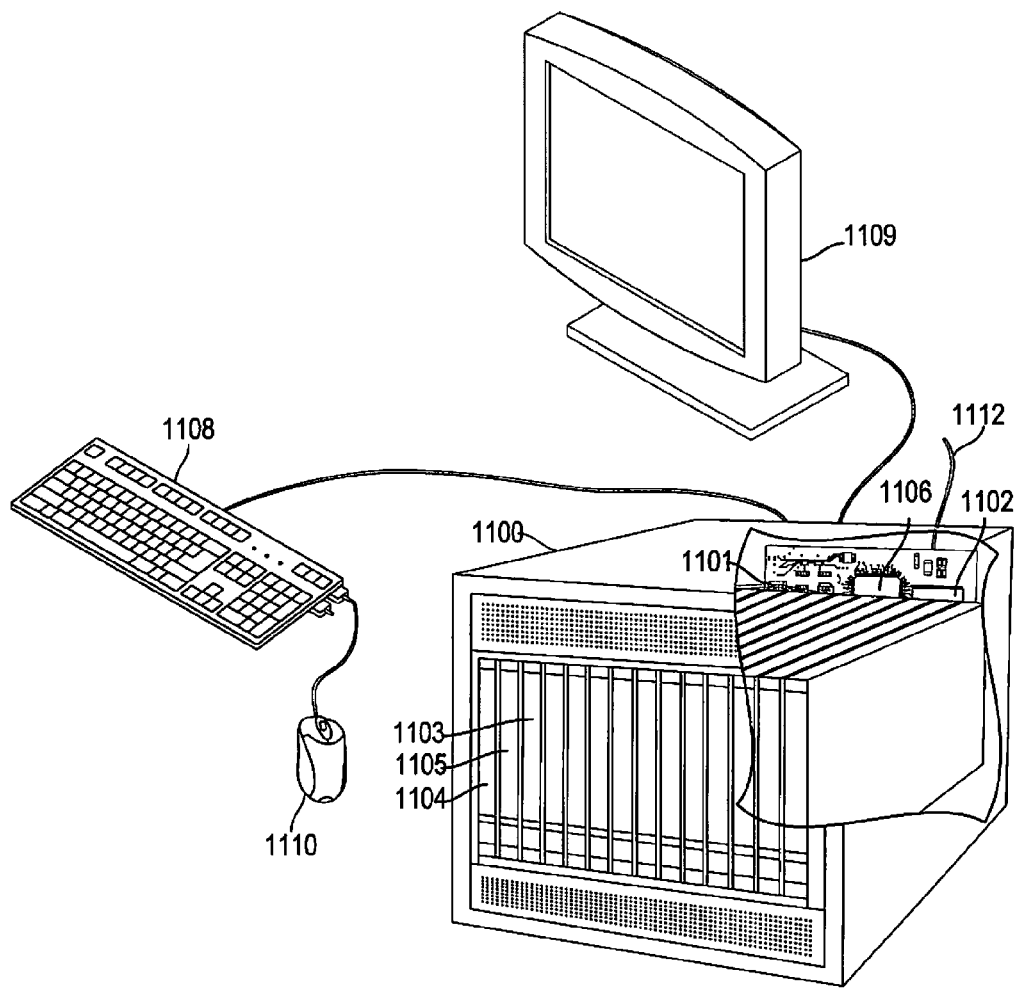
FIG. 7 is a perspective view of a computing device suitable for use as a server in various aspects.

FIG. 6 is a block diagram of a computing device suitable for use with any of the embodiments. As previously described, the subscriber may interact with the various servers and network components using a variety of the computing devices, including a personal computer. By way of illustration, the functional components of a computing device 1000 are illustrated in FIG. 7.

Such a computing device 1000 typically includes a processor 1001 coupled to volatile memory 1002 and a large capacity nonvolatile memory, such as a disk drive 1003. Typically, software applications, such as an email client, may be stored in the internal memory 1002 before they are accessed and loaded into the processor 1001. The processor 1001 may include internal memory sufficient to store the application software instructions.

The computing device 1000 may also include a floppy disc drive 1004 and a compact disc (CD) drive 1005 coupled to the processor 1001. Typically the computing device 1000 will also include a pointing device such as a mouse 1007, a user input device such as a keyboard 1008 and a display 1009. The computing device 1000 may also include a number of connector ports 1006 coupled to the processor 1001 for establishing data connections or network connections or for receiving external memory devices, such as a USB or FireWire® connector sockets. In a notebook configuration, the computer housing includes the pointing device 1007, keyboard 1008 and the display 1009 as is well known in the computer arts.

While the computing device 1000 is illustrated as using a desktop form factor, the illustrated form is not meant to be limiting. For example, some or all of the components of the computing device 1000 may be implemented as a desktop computer, a laptop computer, a mini-computer, or a personal data assistant.

The various embodiments may also be implemented on any of a variety of commercially available server devices, such as the server 1100 illustrated in FIG. 7.

Such a server 1100 typically includes a processor 1101, for execution of the visibility rules or the performance of the tasks of an email server, coupled to volatile memory 1102 and a large capacity nonvolatile memory, such as a disk drive 1103. The server 1100 may also include a floppy disc drive, compact disc (CD) or DVD disc drive 1104 coupled to the processor 1101. The server 1100 may also include network access ports 1106 coupled to the processor 1101 for establishing data connections with a network 1112, such as a local area network coupled to other broadcast system computers and servers. Servers 1100 may also include operator interfaces, such as a keyboard 1108, pointer device (e.g., a computer mouse 1110), and a display 1109.

The processors 1001, 1101 may be any programmable microprocessor, microcomputer or multiple processor chip or chips that can be configured by software instructions (applications) to perform a variety of functions, including the functions of the visibility rules as illustrated in various embodiments described above.

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an," or "the," is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The blocks of a method or algorithm disclosed herein may be embodied in a processor-executable software module, which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.)

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the following claims and the principles and novel features disclosed herein.

What is claimed is:

1. A computing device for creating a searchable database using logical semantic structure of sentences, comprising:
    a memory;
    a datastore; and
    a processor coupled to the memory, wherein the processor is configured with processor-executable instructions to perform operations comprising:
        receiving unstructured training text;
        running a natural language processor (NLP) pipeline on the unstructured training text, the unstructured training text comprising sentences;
        creating sentence matrix representations of the unstructured training text based on output of running the NLP pipeline on the unstructured training text, each of the sentence matrix representations corresponding to a semantic structure of an individual sentence;
        storing the sentence matrix representations in an indexed datastore;
        combining the stored sentence matrix representations in a sum to form a training matrix;
        performing a Singular Value Decomposition (SVD) computation on the training matrix to calculate SVD components;
        storing the calculated SVD components in the indexed datastore;
        applying the calculated SVD components to each of the sentence matrix representations to form a low-dimensional matrix representation for each of the sentences of the unstructured training text; and
        storing the low-dimensional matrix representations in the indexed datastore.

2. The computing device of claim 1, wherein the sentence matrix representations are cooccurrence sentence matrix representations.

3. The computing device of claim 1, wherein the sentence matrix representations are taken from the group consisting of an adjacency sentence matrix representation, a weighted Laplacian matrix, and an unweighted Laplacian matrix.

4. The computing device of claim 1, wherein the SVD computation performed on the training matrix is calculated utilizing processor-executable instructions selected from the group consisting of clustering instructions, classification instruction, and an Apache Mahout library.

5. The computing device of claim 1, wherein the processor is configured with processor-executable instructions to perform operations further comprising:
    performing a low-dimensional projection computation of each stored sentence matrix representation ($C_i$) as $P_i$, wherein $P_i = S_z^{-0.5} U_z^{\,\prime} V_Z S_z^{-0.5}$; and
    storing the low-dimensional projection matrix $P_i$ in a second indexed datastore.

6. The computing device of claim 1, wherein the processor is configured with processor-executable instructions to perform operations further comprising:
    receiving unstructured query text from a user device;
    performing the NPL pipeline on the unstructured query text, the unstructured query text comprising a sentence;
    creating a sentence matrix representation based on output of performing the NLP pipeline on the unstructured query text;
    converting the sentence matrix representation of the unstructured query text into a low-dimensional matrix representation using the SVD components;
    identifying sentences in the unstructured training text having semantic structures similar to a semantic structure of the sentence in the unstructured query text by comparing the low-dimensional matrix representation of the unstructured query text to the low-dimensional matrix representations of the unstructured training text;
    calculating a distance between the low-dimensional matrix representation of the unstructured query text and the low-dimensional matrix representations of the unstructured training text stored in the indexed database; and
    sending to the user device a document associated with a low-dimensional matrix representation of the unstructured training text having a closest distance to the low-dimensional matrix representation of the unstructured query text.

7. The computing device of claim 6, wherein creating the sentence matrix representation of the unstructured query text comprises creating a cooccurrence matrix.

8. The computing device of claim 6, wherein creating the sentence matrix representation of the unstructured query text comprises creating an adjacency matrix.

9. The computing device of claim 6, wherein the processor is configured with processor-executable instructions to perform operations further comprising:
    performing a low-dimensional projection computation on the sentence matrix representation of the unstructured query text;
    storing the low-dimensional projection data in a second indexed datastore.

10. The computing device of claim 6, wherein the indexed datastore is stored in an indexed database taken from the group consisting of an Accumulo database, an HBase database, a MySQL database, and a Cassandra database.

11. The computing device of claim 1, wherein the indexed datastore comprises an indexed datastore taken from the group consisting of an Accumulo database, an HBase database, a MySQL database, and a Cassandra database.

12. The computing device of claim 1, wherein the processor is configured with processor-executable instructions to perform operations such that performing a Singular Value Decomposition (SVD) computation on the training matrix further comprises:
creating z most important calculated SVD components $U_z$, $V_z$, and $S_z$, where z indicates the z singular values with the largest absolute value, and their corresponding singular vectors in $U_z$ and $V_z$.

13. The computing device of claim 1, wherein the processor is configured with processor-executable instructions to perform operations such that applying the calculated SVD components comprises reiterating through the sentence matrix representations ($C_i$) from the NLP Pipeline to form a low-dimensional matrix conversion $P_i = S_z^{-0.5} U_z' C_i V_z S_z^{-0.5}$ for each sentence in the unstructured training text based on the calculated SVD components.

14. A non-transitory processor-readable storage medium having stored thereon processor-executable software instructions configured to cause a processor to perform operations for creating a searchable database using matrix-theoretic functions of graph-theoretic representations of sentences, the operations comprising:
receiving unstructured training text;
performing a natural language processor (NLP) pipeline on the unstructured training text, the unstructured training text comprising sentences;
creating sentence matrix representations of the unstructured training text based on output of performing the NLP pipeline on the unstructured training text, each of the sentence matrix representations corresponding to a semantic structure of an individual sentence;
storing the sentence matrix representations in an indexed datastore;
combining the sentence matrix representations as a sum to form a training matrix;
performing a Singular Value Decomposition (SVD) computation on the training matrix to calculate SVD components;
storing the calculated SVD components in the indexed datastore;
applying the calculated SVD components to each of the sentence matrix representations to form a low-dimensional matrix representation for each of the sentences of the unstructured training text; and
storing the low-dimensional matrix representations in the indexed datastore.

15. The non-transitory processor-readable storage medium of claim 14, wherein the stored processor-executable software instructions are configured to cause a processor to perform operations such that a sentence matrix representation is a cooccurrence sentence matrix representation.

16. The non-transitory processor-readable storage medium of claim 14, wherein the stored processor-executable software instructions are configured to cause a processor to perform operations such that a sentence matrix representation is an adjacency sentence matrix representation, a weighted Laplacian matrix, or an unweighted Laplacian matrix.

17. The non-transitory processor-readable storage medium of claim 14, wherein the stored processor-executable software instructions are configured to cause a processor to perform operations such that the SVD computation is performed utilizing clustering instructions, classification instruction, or an Apache Mahout library on the stored indexed data.

18. The non-transitory processor-readable storage medium of claim 14 wherein the stored processor-executable software instructions are configured to cause a processor to perform operations further comprising:
performing a low-dimensional projection computation of each of the sentence matrix representations ($C_i$) as $P_i$, wherein $P_i = S_z^{-0.5} U_z' C_i V_z S_z^{-0.5}$; and
storing the low-dimensional projection computation data in a second indexed datastore.

19. The non-transitory processor-readable storage medium of claim 14, wherein the stored processor-executable software instructions are configured to cause a processor to perform operations further comprising:
receiving unstructured query text from a user device;
performing the NLP pipeline on the unstructured query text, the unstructured query text comprising a sentence;
creating a sentence matrix representation on the unstructured query text;
storing the sentence matrix representation of the unstructured query text in the indexed datastore;
converting the sentence matrix of the unstructured query text into a lower-dimensional matrix representation using the calculated SVD components;
identifying sentences in the unstructured training text having semantic structures similar to a semantic structure of the sentence in the unstructured query text by comparing the low-dimensional matrix representation of the unstructured query text to the low-dimensional matrix representations of the unstructured training text;
calculating a distance between the low-dimensional matrix representation of the unstructured query text and the low-dimensional matrix representations of the unstructured training text in the indexed datastore; and
sending to the user device a document associated with a low-dimensional matrix representation of the unstructured training text having a closest distance to the low-dimensional matrix representation of the unstructured query text.

20. The non-transitory processor-readable storage medium of claim 19, wherein the stored processor-executable software instructions are configured to cause a processor to perform operations such that the sentence matrix representation for the unstructured query text is a cooccurrence sentence matrix representation.

21. The non-transitory processor-readable storage medium of claim 19, wherein the stored processor-executable software instructions are configured to cause a processor to perform operations such that the sentence matrix representation for the unstructured query text is an adjacency sentence matrix representation.

22. The non-transitory processor-readable storage medium of claim 19, wherein the stored processor-executable software instructions are configured to cause a processor to perform operations further comprising:
performing a low-dimensional projection computation of the sentence matrix representation of the unstructured query text, and
storing the low-dimensional projection data in a second indexed datastore.

23. The non-transitory processor-readable storage medium of claim 19, wherein the processor-executable software instructions are configured to cause a processor to perform operations further comprising storing data from the indexed datastore in an indexed database taken from the group consisting of an Accumulo database, an HBase database, a MySQL database, and a Cassandra database.

24. The non-transitory processor-readable storage medium of claim 14, wherein the processor-executable software instructions are configured to cause a processor to perform operations such that the indexed datastore comprises a database selected from the group consisting of an Accumulo database, an HBase database, a MySQL database, and a Cassandra database.

25. The non-transitory processor-readable storage medium of claim 14, wherein the stored processor-executable software instructions are configured to cause a processor to perform operations such that performing a Singular Value Decomposition (SVD) computation on the training matrix comprises creating z most important calculated SVD components $U_z, V_z$, and $S_z$, where z indicates z singular values with the largest absolute value, and their corresponding singular vectors in $U_z$ and $V_z$.

26. The non-transitory processor-readable storage medium of claim 14, wherein the stored processor-executable software instructions are configured to cause a processor to perform operations such that applying the calculated SVD components comprises reiterating through the sentence matrix representations ($C_i$) from the NLP Pipeline to form a low-dimensional matrix conversion $P_i = S_z^{-0.5} U_z^t C_i V_z^{-0.5}$ for each sentence in the unstructured training text based on the calculated SVD components.

27. A computing device for creating a searchable database using semantic dependencies, comprising:
    means for receiving unstructured training text;
    means for performing a natural language processor (NLP) pipeline on the unstructured training text, the unstructured training text comprising sentences;
    means for creating sentence matrix representations of the unstructured training text based on output of performing the NLP pipeline on the unstructured training text, each of the sentence matrix representations corresponding to a semantic structure of an individual sentence;
    means for storing the sentence matrix representations in an indexed datastore;
    means for combining the sentence matrix representations as a sum to form a training matrix;
    means for performing a Singular Value Decomposition (SVD) computation on the training matrix to calculate SVD components;
    means for storing the calculated SVD components in the indexed datastore;
    means for applying the calculated SVD components to each of the sentence matrix representations to form a low-dimensional matrix representation for each of the sentences of the unstructured training text; and
    storing the low-dimensional matrix representations in the indexed datastore.

28. The computing device of claim 27, wherein the means for creating sentence matrix representations comprises means for creating cooccurrence matrices.

29. The computing device of claim 27, wherein the means for creating sentence matrix representations comprises a means for creating adjacency matrices.

30. The computing device of claim 27, wherein the means for performing an SVD computation on the training matrix comprises means for utilizing an Apache Mahout library on the training matrix.

31. The computing device of claim 27, further comprising:
    means for performing a low-dimensional projection computation of the stored sentence matrix representations, and
    means for storing the low-dimensional projection data in a second indexed datastore.

32. The computing device of claim 27, wherein the indexed datastore is stored in an indexed database taken from the group consisting of an Accumulo database, an HBase database, a MySQL database, and a Cassandra database.

33. The computing device of claim 27, wherein the means for performing a Singular Value Decomposition (SVD) computation on the training matrix comprises means for performing an SVD computation on the training matrix to create z most important calculated SVD components $U_z, V_z$, and $S_z$, where z indicates z singular values with the largest absolute value, and their corresponding singular vectors in $U_z$ and $V_z$.

34. A method for creating a searchable database using semantic dependencies comprising:
    receiving unstructured training text;
    performing a natural language processor (NLP) pipeline on the unstructured training text, the unstructured training text comprising sentences;
    creating sentence matrix representations of the unstructured training text based on output of performing the NLP pipeline on the unstructured training text, each of the sentence matrix representations corresponding to a semantic structure of an individual sentence;
    storing the sentence matrix representations in an indexed datastore;
    combining the stored sentence matrix representations as a sum to form a training matrix;
    performing a Singular Value Decomposition (SVD) computation on the training matrix to calculate SVD components;
    storing the calculated SVD components in the indexed datastore;
    applying the calculated SVD components to each of the sentence matrix representations to form a low-dimensional matrix representation for each of the sentences of the unstructured training text; and
    storing the low-dimensional matrix representations in the indexed datastore.

35. The method of claim 34, wherein creating the sentence matrix representations comprises creating cooccurrence matrices.

36. The method of claim 34, wherein creating the sentence matrix representations comprises creating adjacency matrices, weighted Laplacian matrices, or unweighted Laplacian matrices.

37. The method of claim 34, wherein performing a SVD computation comprises utilizing clustering instructions, classification instruction, or an Apache Mahout library on the stored indexed data.

38. The method of claim 34 further comprising:
    performing a low-dimensional projection computation on each of the stored sentence matrix representations ($C_i$) as $P_i$, wherein $P_i = S_z^{-0.5} U_z^t C_i V_z S_z^{-0.5}$; and
    storing the low-dimensional projection computation data in a second indexed datastore.

39. The method of claim 34, the method further comprising:
    receiving unstructured query text from a user device;
    performing the NLP pipeline on the unstructured query text, the unstructured query text comprising a sentence;
    creating a sentence matrix representation based on output of performing the NLP pipeline on the unstructured query text;
    storing the sentence matrix representation of the unstructured query text in the indexed datastore;
    converting the sentence matrix representation of the unstructured query text into a low-dimensional matrix representation using the calculated SVD components;

identifying sentences in the unstructured training text having semantic structures similar to a semantic structure of the sentence in the unstructured query text by comparing the low-dimensional matrix representation of the unstructured query text to the low-dimensional matrix representations of the unstructured training text;

calculating a distance between the low-dimensional matrix representation of the unstructured query text and the low-dimensional matrix representations of the unstructured training text stored in the indexed datastore; and sending to the user device a document associated with a low-dimensional matrix representation of the unstructured training text having a closest distance to the low-dimensional matrix representation of the unstructured query text.

40. The method of claim 39, wherein creating the sentence matrix representation of the unstructured query text comprises creating a cooccurrence matrix.

41. The method of claim 39, wherein creating the sentence matrix representation of the unstructured query text comprises creating an adjacency matrix.

42. The method of claim 39, further comprising:

performing a low-dimensional projection computation on the sentence matrix representation of the unstructured query text; and storing the low-dimensional projection data in a second indexed datastore.

43. The method of claim 39, wherein the indexed datastore is stored in an indexed database taken from the group consisting of an Accumulo database, an HBase database, a MySQL database, and a Cassandra database.

44. The method of claim 34, wherein the indexed datastore is stored in an indexed database taken from the group consisting of an Accumulo database, and HBase, database, a MySQL database and a Cassandra database.

45. The method of claim 34, wherein performing a Singular Value Decomposition (SVD) computation on the training matrix comprises creating z most important calculated SVD components $U_z$, $V_z$, and $S_z$, where z indicates z singular values with the largest absolute value, and their corresponding singular vectors in $U_z$ and $V_z$.

* * * * *